United States Patent [19]

Brekner et al.

[11] Patent Number: 5,789,492
[45] Date of Patent: Aug. 4, 1998

[54] WEATHERING-RESISTANT POLYMER ALLOYS

[75] Inventors: Michael-Joachim Brekner; Hansotto Drotloff, both of Frankfurt am Main; Otto Hermann-Schönherr, Bensheim; Arnold Schneller, Mainz, all of Germany

[73] Assignee: Hoechst Aktiengesellschaft, Frankfurt, Germany

[21] Appl. No.: 896,799

[22] Filed: Jun. 9, 1992

Related U.S. Application Data

[63] Continuation of Ser. No. 640,997, Jan. 14, 1991, abandoned.

[30] Foreign Application Priority Data

Jan. 16, 1990 [DE] Germany ............... 40 01 036.8

[51] Int. Cl.$^6$ ............... C08L 67/03; C08L 71/10
[52] U.S. Cl. ............... 525/437; 525/394; 525/397; 525/439; 525/462; 525/471
[58] Field of Search ............... 525/394, 397, 525/437, 439, 462, 471

[56] References Cited

U.S. PATENT DOCUMENTS

| | | | |
|---|---|---|---|
| 4,159,287 | 6/1979 | Ames | 525/380 |
| 4,386,174 | 5/1983 | Cogswell | 525/397 |
| 4,749,754 | 6/1988 | Gallucci | 525/432 |
| 4,857,594 | 8/1989 | Lakshmanan | 525/210 |
| 5,006,402 | 4/1991 | Isayev | 525/438 |
| 5,011,894 | 4/1991 | Robeson | 525/437 |
| 5,166,304 | 11/1992 | Dubal | 528/125 |

FOREIGN PATENT DOCUMENTS

| | | | |
|---|---|---|---|
| A-0 113 112 | 7/1984 | European Pat. Off. | |
| A-0 349 648 | 1/1990 | European Pat. Off. | |
| A-0 365 917 | 5/1990 | European Pat. Off. | |
| 00605 | 1/1988 | WIPO | 525/471 |

*Primary Examiner*—David Buttner
*Attorney, Agent, or Firm*—Frommer Lawrence & Haug LLP

[57] ABSTRACT

For optical applications, transparent amorphous thermoplastics, such as polyaryl ether ketones, are of considerable interest. However, polyaryl ether ketones have inadequate UV stability and weathering resistance while amorphous polyaryl esters do not have these negative properties. The properties can be improved by means of polymer alloys, giving weathering-resistant materials from homogeneously mixed polymers which comprise at least one amorphous polyaryl ether ketone and at least one amorphous polyaryl ester.

15 Claims, No Drawings

WEATHERING-RESISTANT POLYMER ALLOYS

This application is a continuation of application Ser. No. 07/640,997, filed Jan. 14, 1991 now abandoned.

The invention relates to weathering-resistant polymer alloys comprising an amorphous polyaryl ether ketone and a polyaryl ester, and to their use.

Transparent amorphous thermoplastics are increasingly being used in optical components, in optical systems in high-performance optics and in special-purpose optics in the form of lenses, prisms, as substrate materials for various optical coatings, as a transparent coating material for mirrors, lenses and prisms, and as optical waveguides. The advantage of the thermoplastics is that they are relatively inexpensive to process compared with glass and have a particularly advantageous low density for mobile optics. The surfaces of optical components made from thermoplastics are frequently not subjected to high-cost treatment, since the thermoplastics can be cast or injection-molded in polished molds. In this connection, amorphous transparent polyaryl ether ketones are of considerable industrial interest due to their low water-absorption capacity, their high transparency, their high glass transition temperatures and high refractive indices at the same time as low densities.

By contrast, however, it is known that polyaryl ether ketones, but in particular amorphous polyaryl ether ketones, do not have satisfactory UV stability and weathering resistance. For optical applications of amorphous transparent polyaryl ether ketones in the open air where they are subjected to sunlight and water, improved weathering resistance is therefore necessary.

It is also known that amorphous polyaryl esters (H. Domininghaus, Die Kunststoffe und ihre Eigenschaften [Plastics and their properties], VDI Verlag, Second Edition, 1986, Düsseldorf, page 535) are very resistant to the effects of UV rays and are thus highly suitable for outdoor use. Even without additives, they have high weathering resistance. These materials undergo virtually no yellowing in the open air, but the transparency is retained.

Alloying of polymers so that the components are homogeneously mixed on a molecular level is only possible with difficulty, if at all. However, such alloying may allow important properties to be improved or modified as desired.

However, the properties of a homogeneously mixed alloy cannot be reliably predicted from the properties of the individual components. For this reason, alloying of polymers remains substantially empirical. In particular, the homogeneous miscibility of alloys, specifically those made from strongly interacting polymers, cannot be predicted in spite of a very large number of experimental and theoretical papers in this area.

Rather, it is known that the great majority of pairs of polymers form two-phase blends after mixing and that these mixtures are characterized by opacity, different thermotransitions (for example glass transitions) and poor mechanical properties (cf. Olabisi, Robeson, Shaw: Polymer—Polymer Miscibility, Academic Press, New York, p. 7, 1979).

A clear criterion for homogeneous miscibility is the occurrence of a single glass transition temperature between the glass transition temperatures of the components used to produce the mixture. The transparency of films made from polymer alloys is an indication that the components are homogeneously mixed.

The object of the present invention was to provide transparent, polyaryl ether ketone-based alloys having good weathering stability.

It has been found that certain amorphous polyaryl ether ketones are homogeneously miscible with certain amorphous polyaryl esters and that the alloys obtained are transparent and more weathering-resistant than the amorphous polyaryl ether ketones themselves.

The invention thus relates to an alloy comprising homogeneously mixed polymers and containing:

a) at least one amorphous polyaryl ether ketone having a Staudinger index of from 0.2 to 3 dl/g and b) at least one polyaryl ester having a Staudinger index of from 0.1 to 2 dl/g.

In addition, the invention relates to the use of an alloy for producing moldings, injection-molded products or extruded products in the form of fibers, films or tubes.

The individual components are employed in the following amounts:

(a) amorphous polyaryl ether ketone: 2 to 98% by weight, preferably 40 to 98% by weight, in particular 70 to 98% by weight;

(b) polyaryl esters: 2 to 98% by weight, preferably 2 to 60% by weight, in particular 2 to 30% by weight, in each case based on the total alloy.

The polyaryl ether ketones a) are built up from recurring units of the formula (I)

where A is selected from the radicals

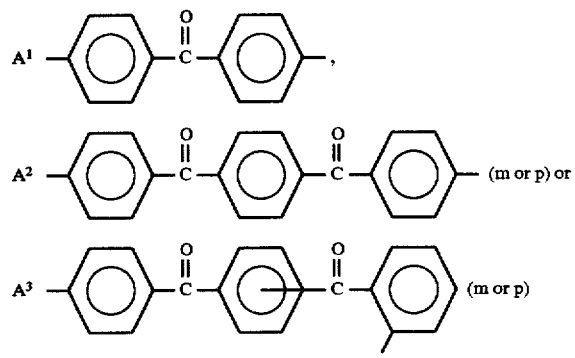

and B is selected from the radicals

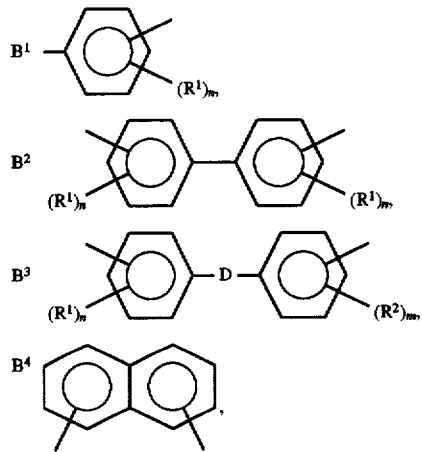

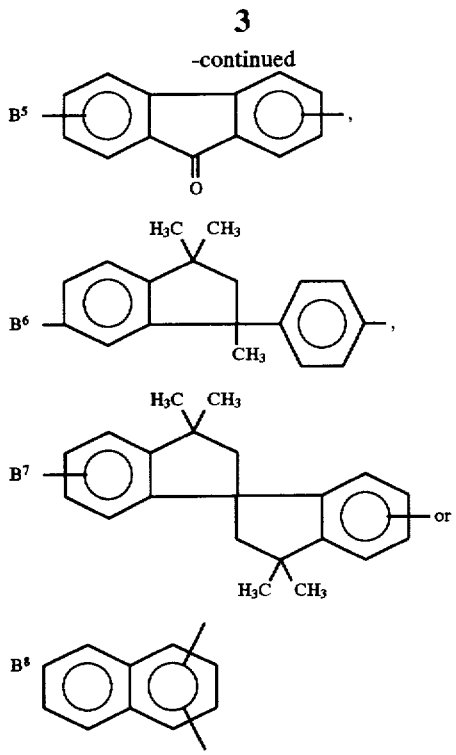

where $R^1$ and $R^2$, which are identical or different, are halogen, preferably bromine, $C_1$–$C_8$–alkyl or –alkoxy, preferably $C_1$–$C_4$–alkyl or –alkoxy, and m and n are identical or different and are zero or an integer from 1 to 4, preferably zero, 1 or 2, in particular zero or 2. If $R^1$ and $R^2$ in the radicals $B^2$ and $B^3$ are halogen, m and n are preferably 2. D is selected from the bivalent radicals

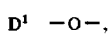
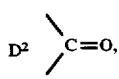
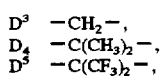
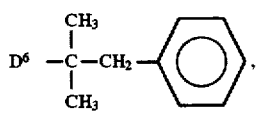
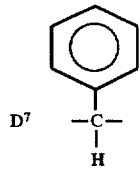
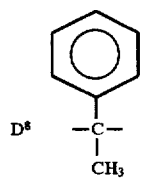
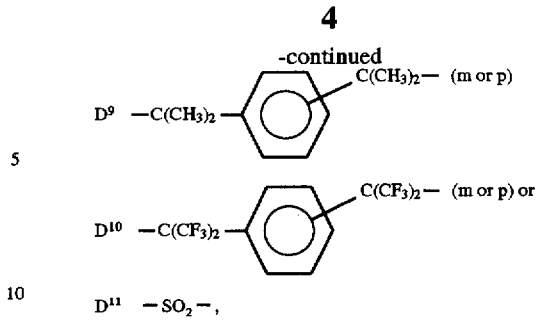

$D^{11}$ —$SO_2$—, the molar ratio between the units A and B being from 0.95 to 1.05:1.0, preferably 1:1.

The polymers listed may be homopolymers containing only one unit of type A and one unit of type B per recurring unit, or copolycondensates containing two or more different units of type A and/or two or more different units of type B.

A is preferably $A^1$ or $A^2$, in particular $A^2$. B is preferably $B^1$, $B^2$ or $B^3$, in particular $B^3$. D is preferably $D^2$, $D^3$, $D^4$, $D^5$, $D^6$, $D^7$, $D^8$ or $D^{11}$, or $D^9$ or $D^{10}$ linked in the para-position. $D^4$, $D^5$, $D^8$ and $D^{10}$ are particularly preferred.

If A is $A^1$ or $A^2$, B is not $B^4$. If B is $B^3$ and n is zero, D is not $D^1$ or $D^2$.

If A in the structural unit (I) is $A^3$, B is preferably $B^1$ or $B^2$ and n is preferably zero, 1 or 2, in particular zero.

Copolyether ketones contain from 0 to 50 mol-% of units $A^2$, and from 50 to 0 mol-% of units $A^3$, preferably from 5 to 30 mol-% of $A^2$ and from 45 to 20 mol-% of $A^3$, in the presence of $B^1$, $B^2$ or $B^4$.

The radical A in copolyether ketones may alternatively be $A^1$, $A^2$ or $A^3$ and the radical B contains from 0 to 50 mol-%, preferably from 5 to 20 mol-%, in particular from 5 to 10 mol-%, of units $B^1$ and from 50 to 0 mol-%, preferably from 45 to 30 mol-%, in particular from 45 to 40 mol-%, of units selected from $B^2$, $B^3$ and $B^4$.

The amorphous polyaryl ether ketones have Staudinger indices, measured at 25° C. in chloroform, N-methylpyrrolidone or N,N-dimethylacetamide, of from 0.2 to 3 dl/g, preferably from 0.3 to 1.0 dl/g, in particular from 0.3 to 0.6 dl/g.

The polyaryl esters b) are polyester carbonates, preferably copolyesters, containing carbonate groups, carboxylate groups and aromatic groups, at least one of the carboxyl groups and at least one of the carbonate groups being bonded directly to the ring carbon atoms of the aromatic groups. These polymers are prepared by reacting aromatic carboxylic acids with dihydroxyphenols and carbonate precursors. It is also possible to employ reactive derivatives of aromatic dicarboxylic acids, such as terephthaloyl dichloride, isophthaloyl dichloride or mixtures of the two.

The dihydroxyphenols used to synthesize suitable polyester carbonates have the general formula

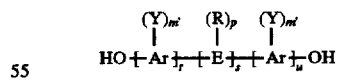

where Ar is an aromatic group, such as phenylene, bisphenylene or naphthylene, and E is alkylene or alkylidene, such as methylene, ethylene or isopropylidene. E may alternatively comprise two or more alkylene or alkylidene groups, connected by an aromatic group, a carbonyl group, a sulfide group, a sulfoxide group, a sulfone group or an ether group. E may also be a cycloaliphatic group, a sulfide group, a sulfoxide group, a sulfone group, an ether bond or a carbonyl group.

R is hydrogen, $C_1$–$C_6$–alkyl, $C_6$–$C_{12}$–aryl or a cycloaliphatic radical. Y is as defined for R or is halogen or a nitro group, s, t and u, independently of one another, are zero or 1, m' and p, independently of one another, are zero or an integer which is at most as large as the maximum possible number of the substituents which A or E are able to carry.

If more than one of the substituents labeled Y are present, they may be identical or different. The same applies to R. The hydroxyl groups and Y may be bonded to the aromatic radical in the para-, meta- or ortho-position.

Preferred dihydroxyphenols for the preparation of the polyaryl esters b) are those of the formula (II)

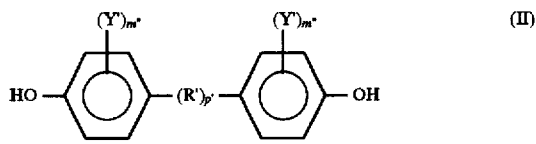

in which Y' is $C_1$–$C_4$-alkyl, $C_6$–$C_{12}$-cycloalkyl or halogen, preferably Cl or F. Each m" is, independently of one another, zero, 1, 2, 3 or 4, preferably zero, R' is $C_1$–$C_8$-alkylene, $C_1$–$C_8$-alkylidene or $C_6$–$C_{20}$-arylene, preferably $C_6$–$C_{12}$-arylene, in particular $C_3$-alkylidene, and p' is zero or 1.

The dihydroxyphenols may be used alone or as mixtures of at least two dihydroxyphenols.

Aromatic dicarboxylic acids for synthesizing suitable polyaryl esters a) have the general formula (III)

HOOC—R"—COOH    (III), where R" is selected from the groups

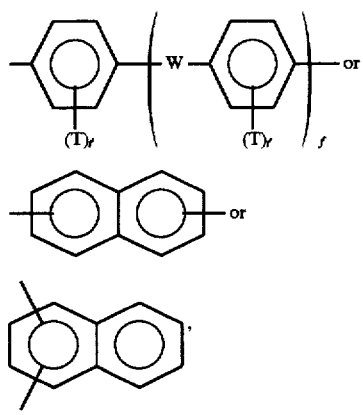

where f is zero or 1, and W is O, $SO_2$, CO, $C(CH_3)_2$, $CH_2$, S or

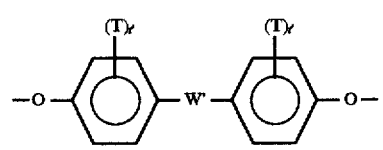

where W' is as defined above for W.

T is $C_1$–$C_6$-alkyl, preferably methyl, propyl or butyl, or halogen, preferably F, Cl or Br, and t' is zero or an integer 1, 2, 3 or 4.

Preferred aromatic dicarboxylic acids are isophthalic acid, terephthalic acid or mixtures of the two.

Carbonate precursors which can be used to synthesize the polyester carbonates are carbonyl halides, for example carbonyl chloride, carbonyl bromide or phosgene, and carbonate esters, for example diphenyl carbonate.

The alloys may additionally contain polyaryl esters derived from at least one of the above-described dihydroxyphenols, and at least one of the above-described aromatic dicarboxylic acids or reactive derivatives thereof.

These polyaryl esters are prepared, for example, by reacting acid chlorides with dihydroxyphenols or by reacting dicarboxylic acids with diester derivatives of dihydroxyphenols or by reacting dihydroxyphenols with dicarboxylic acids and diaryl carbonates.

The polyester carbonate may be a copolymer of bisphenol A, terephthaloyl dichloride, isophthaloyl dichloride or mixtures of the two and phosgene. However, the copolymer may also be prepared from bisphenol A, terephthalic acid, isophthalic acid or mixtures of the two.

The Staudinger indices of the polyaryl esters or polyester carbonates used are in the range from 0.1 to 2, preferably from 0.2 to 1.5, in particular from 0.3 to 0.8, measured at 25° C. in p-chlorophenol, methylene chloride, N,N-dimethylformamide or N-methylpyrrolidone.

The term polyaryl esters as used here includes homopolymers, copolymers, terpolymers and block copolymers.

The alloys are prepared by known alloying methods. For example, the alloy partners are extruded jointly in an extruder in the form of powders or granules to give extrudates, which are granulated and converted into the desired shape, for example by pressing or injection molding.

The alloys are used to produce moldings, injection-moldings or extrusion products in the form of fibers, films or tubes.

The alloys may contain additives, for example plasticizers, thermal stabilisers, impact modifiers or reinforcing additives, such as glass fibers, carbon fibers or high-modulus fibers.

EXAMPLES

The following polymers were synthesized by standard methods; their molecular weights were determined by high-temperature gel permeation chromatography (measurement conditions: 80° C., N,N-dimethylformamide containing 0.06% by weight of LiBr, 3 Ultrastyragel linear and 1 Mikrostyragel 100 A, polystyrene standard) and/or by measuring the Staudinger indices.

The comparative experiments were carried out using a polyether sulfone instead of a polyether ketone.

Polyaryl ether ketone I (Staudinger index: 0.7 dl/g, measured in chloroform at 25° C.; GPC: Mw=65,000 g/mol, Mn=34,000 g/mol, Mw/Mn=1.95) containing recurring units of the following formula:

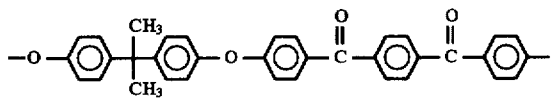

Polyaryl ether ketone II (Staudinger index: 0.4 dl/g, measured in chloroform at 25° C.) containing recurring units of the formula given above for the polyaryl ether ketone I.

Polyaryl ether ketone III (Staudinger index: 0.5 dl/g, measured in chloroform at 25° C.) containing recurring units of the following formula:

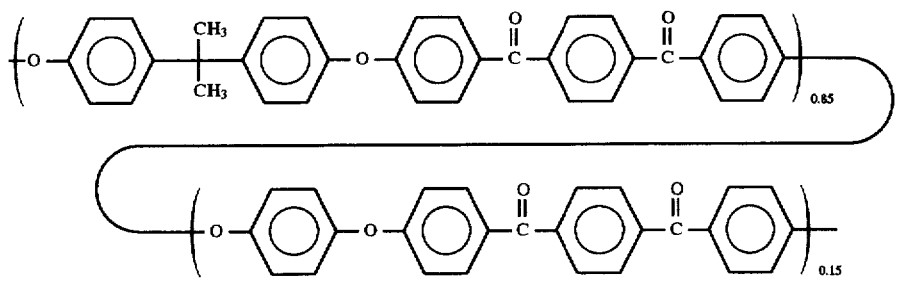

Polyaryl ester I (Staudinger index: 0.5 dl/g, measured in methylene chloride at 25° C.; GPC: Mw=48,000 g/mol, Mn=22,000 g/mol, Mw/Mn=2.1) containing recurring units of the following formula

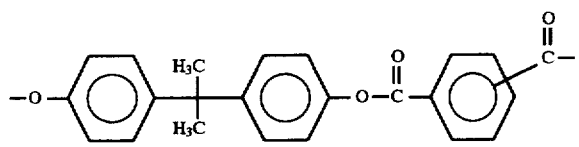

Polyaryl ester II (Staudinger index: 0.7 dl/g, measured in p-chlorophenol at 25° C.; GPC: Mw=61,000 g/mol, Mn=29,000 g/mol, Mw/Mn=2.1) containing recurring units of the following formula:

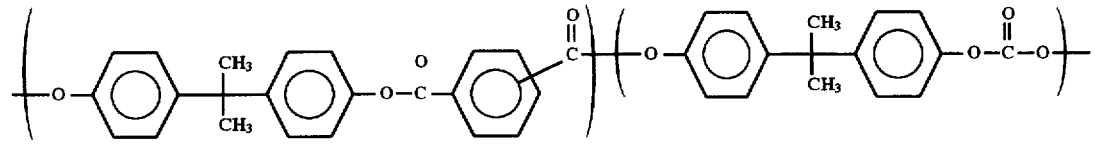

Polyether sulfone I (GPC: Mw=73,000 g/mol; Mn=39,000 g/mol; Mw/Mn=1.9) containing recurring units of the following formula:

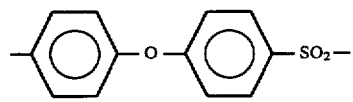

The polymers listed were first dried (120° C., 24 hours, reduced pressure) and then kneaded together in various weight ratios in a measurement kneader (HAAKE, ®Rheocord System 90/Rheomix 600, Karlsruhe, Federal Republic of Germany) under an inert gas. The inert gas used was preferably argon. The alloys obtained were subsequently dried (120° C., 24 hours, reduced pressure). In order to determine the physical properties of the alloys, the following instruments were used: an automatic torsion tester from Brabender, Offenbach, Federal Republic of Germany; a differential calorimeter DSC 7 from Perkin Elmer, Überlingen, Federal Republic of Germany. The weathering resistance was determined in a ®Xenotest instrument from Heraeus, Hanau, Federal Republic of Germany (500 hours in accordance with DIN 53 387).

Example 1

30 g of polyaryl ether ketone I (DSC: glass transition temperature=160° C.) were kneaded together with 30 g of polyaryl ester II (DSC: glass transition temperature=188° C.) under an inert gas (Ar) in a measurement kneader at a temperature of 300° C. at a speed of 100 rpm for 30 minutes. The resultant alloy is transparent and has a single glass transition temperature of 165° C. (DSC). The components employed were therefore homogeneously miscible.

Example 2

30 g of polyaryl ether ketone III (DSC: glass transition temperature 155° C.) were kneaded with 30 g of polyaryl ester I (DSC: glass transition temperature 190° C.) under the conditions given in Example 1. The resultant alloy was transparent and, according to DSC studies, had a single glass transition temperature of 163° C. The components employed were therefore homogeneously miscible.

Example 3

Polyaryl ester I and polyaryl ether ketones I and II were kneaded together in various weight ratios under the conditions indicated in Example 1. Tables 1 and 2 show that the miscibility behavior is dependent on the molecular weight of the components.

TABLE 1

| Percent by weight of polyaryl ether ketone I | Percent by weight of polyaryl ester I | Transparency | Glass transition temperature* |
|---|---|---|---|
| 50 | 50 | no | 162° C./180° C. |

TABLE 2

| Percent by weight of polyaryl ether ketone II | Percent by weight of polyaryl ester I | Transparency | Glass transition temperature** |
|---|---|---|---|
| 50 | 50 | yes | 153° C. |
| 80 | 20 | yes | 150° C. |
| 90 | 10 | yes | 148° C. |
| 100 | 0 | yes | 148° C. |
| 0 | 100 | yes | 185° C. |

**determined by means of an automatic torsion tester on pressed sheets (300° C., 200 bar)

Comparative Example A

In a measurement kneader, a) polyether sulfone I was kneaded together with polyaryl ester I and b) polyether sulfone I was kneaded together with polyaryl ester II in various weight ratios under the conditions indicated in Example 1. Tables 3 and 4 show that the components used were not homogeneously miscible, since the resultant alloys were not transparent and had two glass transition temperatures.

TABLE 3

| Percent by weight of polyether sulfone I | Percent by weight of polyaryl ester I | Transparency | Glass transition temperature (DSC) |
|---|---|---|---|
| 100 | 0 | yes | 225° C. |
| 50 | 50 | no | 225° C./190° C. |
| 80 | 20 | no | 225° C./190° C. |

TABLE 4

| Percent by weight of polyether sulfone I | Percent by weight of polyaryl ester II | Transparency | Glass transition temperature (DSC) |
|---|---|---|---|
| 50 | 50 | no | 225° C./188° C. |
| 80 | 20 | no | 225° C./188° C. |

Comparative Example B

Sheets 1 mm in thickness were pressed from polyaryl ether ketone II and polyether sulfone I (300° C., 100 bar) and weathering tests were carried out. Both the polyaryl ether ketone and the polyether sulfone were no longer transparent after the weathering. The sheets were covered with a cloudy coating which could be removed by gentle scratching.

Example 4

Sheets were pressed (300° C., 100 bar) from the alloys described in Example 1 and in Example 3, Table 2, and weathered. After the weathering, these sheets were transparent, and a coating as described in Comparative Example B was not observed.

We claim:

1. An improved organic polymer alloy containing:

a) at least one polyaryl ether ketone having a reduced viscosity of from 0.2 to 3 dl/g and b) at least one amorphous polyaryl ester having a reduced viscosity of from 0.1 to 2 dl/g, wherein the improvement comprises that the polyaryl ether ketone is amorphous, components a) and b) are homogeneously mixed and the organic polymer alloy is transparent.

2. An alloy as claimed in claim 1, wherein the components are present in the mixing ratios:

a) polyaryl ether ketones: 2 to 98% by weight and b) polyaryl esters: 2 to 98% by weight, in each case based on the total alloy.

3. An alloy as claimed in claim 1, wherein the amorphous polyaryl ether ketone is built up from at least one structural unit of the formula (I)

—O—A—O—B  (I), where A is selected from the radicals

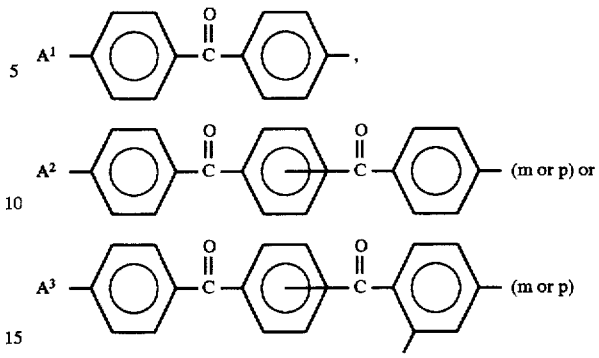

and B is selected from the radicals

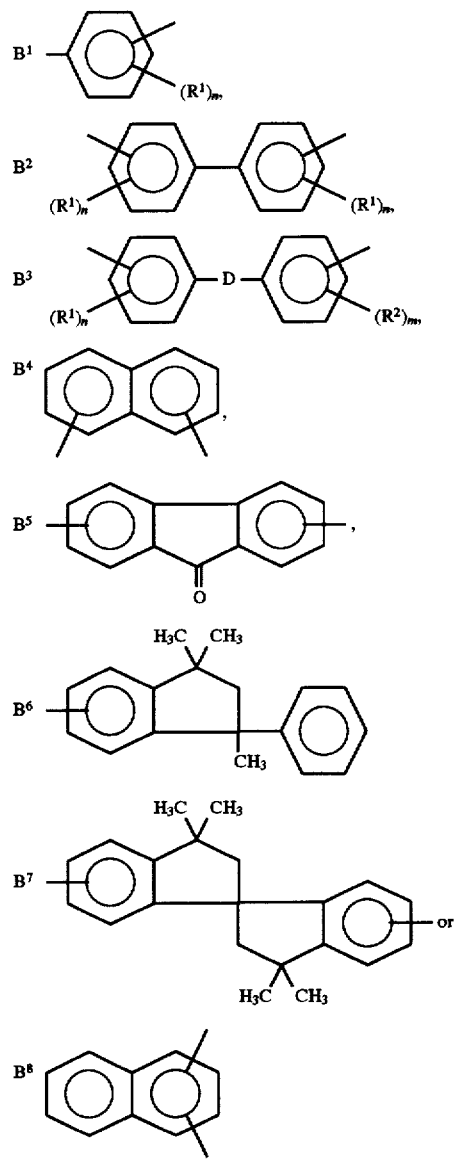

where $R^1$ and $R^2$, which are identical or different, are halogen, $C_1$–$C_8$-alkyl or –alkoxy, m and n are identical or different and are zero or an integer from 1 to 4, and D is selected from the divalent radicals

D¹  —O—,

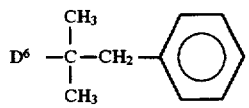

D³  —CH$_2$—,
D⁴  —C(CH$_3$)$_2$—,
D⁵  —C(CF$_3$)$_2$—,

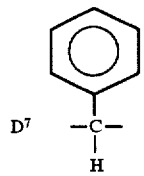

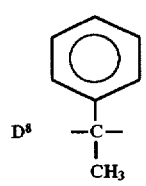

D⁹  —C(CH$_3$)$_2$—⌬—C(CH$_3$)$_2$—  (m or p),

D¹⁰ —C(CF$_3$)$_2$—⌬—C(CF$_3$)$_2$—  (m or p) or

D¹¹ —SO$_2$—, the molar ratio between the units A and B being from 0.95 to 1.05:1.0.

4. An alloy as claimed in claim 3, wherein R¹ and R² are bromine, C$_1$–C$_4$-alkyl or –alkoxy, and m and n are zero, 1 or 2, and the molar ratio between the units A and B is 1:1.

5. An alloy as claimed in claim 1, wherein a homopolycondensate or copolycondensate of the polyaryl ether ketone is employed.

6. An alloy as claimed in claim 5, wherein, in copolycondensates, the polyether ketones contain from 0 to 50 mol-% of units A² and from 50 to 0 mol-% of units A³ in the presence of B¹, B² or B⁴.

7. An alloy as claimed in claim 5, wherein, in copolycondensates, the radical A is selected from A¹, A² and A³, and the radical B contains from 0 to 50 mol-% of units B¹ and from 50 to 0 mol-% of units selected from B², B³ and B⁴.

8. An alloy as claimed in claim 1, wherein the polyaryl ester b) is a polyester carbonate derived from at least one dihydroxyphenol, a carbonate precursor and at least one aromatic dicarboxylic acid or a reactive derivative thereof.

9. An alloy as claimed in claim 8, wherein the dihydroxyphenol has the following formula (II)

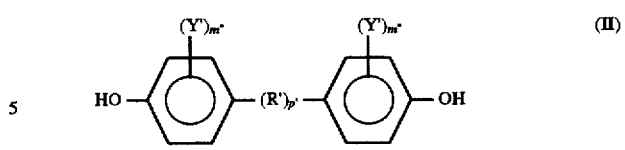

in which Y' is C$_1$–C$_4$-alkyl, C$_6$–C$_{12}$-cycloalkyl or halogen, m", independently of one another, is zero, 1, 2, 3 or 4, R' is C$_1$–C$_8$-alkylene, C$_1$–C$_8$-alkylidene or C$_6$–C$_{20}$-arylene, and p' is zero or 1.

10. An alloy as claimed in claim 8, wherein the aromatic dicarboxylic acid has the formula (III)

HOOC—R"—COOH   (III), where R" is selected from the groups

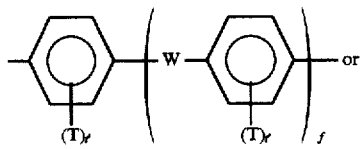

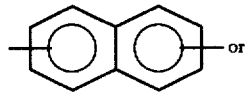

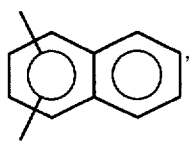

where f is zero or 1, and W is O, SO$_2$, CO, C(CH$_3$)$_2$, CH$_2$, S or

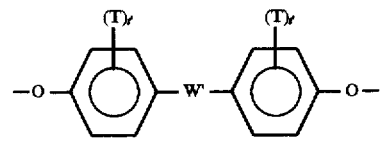

where W' is as defined above for W, and T in the formulae is C$_1$–C$_6$-alkyl and t' is zero, 1, 2, 3 or 4.

11. An alloy as claimed in claim 8, wherein the polyester carbonate is a copolymer of bisphenol A, terephthaloyl dichloride, isophthaloyl dichloride or a mixture of the two and phosgene.

12. An alloy as claimed in claim 8, wherein the dihydroxyphenol is bisphenol A, and the aromatic dicarboxylic acid is terephthalic acid or isophthalic acid or a mixture of the two.

13. A molding produced from an alloy as claimed in claim 1.

14. A molding as claimed in claim 13 in the shape of a fiber, film or tube.

15. An organic polymer alloy consisting essentially of:
   a) at least one amorphous polyaryl ether ketone having a reduced viscosity of from 0.2 to 3 dl/g and
   b) at least one amorphous polyaryl ester having a reduced viscosity of from 0.1 to 2 dl/g,
   wherein components a) and b) are homogeneously mixed and the organic polymer alloy is transparent.

* * * * *